Oct. 22, 1940.  A. PERESLEGIN  2,219,055

DISTRIBUTING ATTACHMENT FOR CONVEYERS

Filed Jan. 25, 1940

ANATOL PERESLEGIN
INVENTOR.

BY John P. Nissonow

Patented Oct. 22, 1940

2,219,055

UNITED STATES PATENT OFFICE 2,219,055

DISTRIBUTING ATTACHMENT FOR CONVEYERS

Anatol Pereslegin, New York, N. Y.

Application January 25, 1940, Serial No. 315,514

6 Claims. (Cl. 198—28)

My invention relates to distributing devices for conveyers and has particular reference to devices for diverting certain portions of objects which are being continuously moved on a conveyer.

Conveyers, especially of a belt type, are often used in machine shops or similar manufacturing establishments for moving loose parts or work between different machines in the process of finishing or assembling such parts. It is then necessary periodically to divert certain quantities of such parts to different machines. Usually this is accomplished by manually removing the parts or boxes with parts from the conveyer and carrying them to the machines. Such operations are uneconomical, however, requiring expenditure of labor.

With my improved attachment it is possible to distribute the required quantities of parts or boxes to different machines automatically, using the power of the conveyer itself for removing required quantities of articles at certain stations near the machines. I provide for this purpose movable or swinging gates at such stations in conjunction with deflecting plates, the latter forming side channels for diverting the moving parts to one side of the conveyer into suitable containers, for instance. I also provide an operating mechanism for the gates and deflecting plates with a remote control for operating them at a distance.

My invention is more fully described in the accompanying specification and drawing in which—

Figure 1:
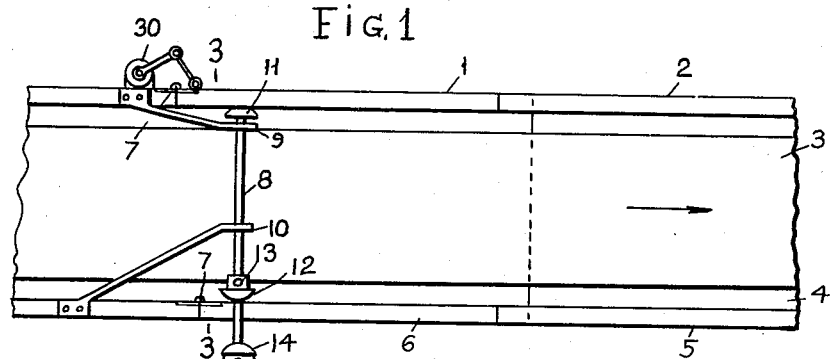
Fig. 1 is a top plan view of a portion of a belt conveyer with my distributing attachment in an inoperative position.
Figure 2:
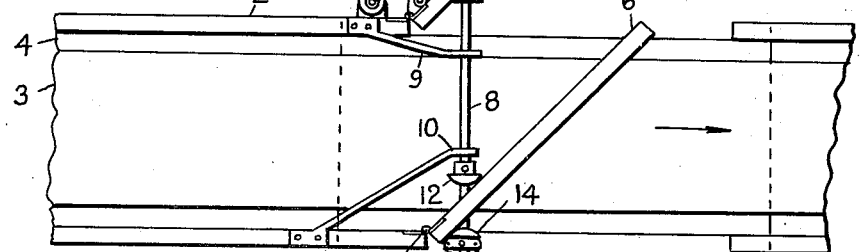
Fig. 2 is a similar view of the attachment with the gate and deflecting plate turned to one side.
Figure 3:
Fig. 3 is a sectional view taken on the line 3—3 of Fig. 1.
Figure 4:
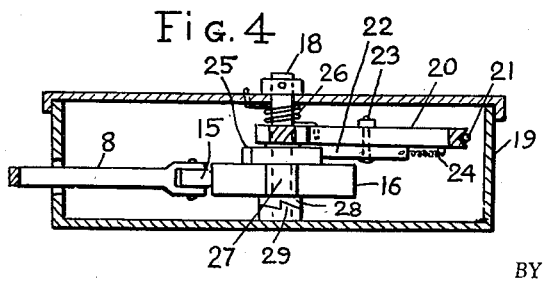
Fig. 4 is an enlarged detail view of an operating mechanism for the gates.

My distributing attachment consists of a deflecting plate or board 1 forming a part of a side wall 2 of a housing for a conveyer belt 3. The latter slides over a bottom plate 4 of the housing, being moved by any suitable mechanism (not shown). A similar wall 5 is placed at the other side of the housing and is provided with a gate board 6 forming a part of this wall. The gate and the deflecting board are mounted on hinges 7 and can be rotated into an open position shown in Fig. 2. The gates are operated by a rod 8 slidably supported in bearings 9 and 10 mounted on the walls 2 and 5 respectively. The end of the rod has an enlarged portion or head 11 engaging the inner side of the gate 6. A similar enlargement or head 12 is adjustably mounted on the rod at the outer side of the deflecting board 1, a set screw 13 being provided for fixing the head in a right position. A third enlarged portion or head 14 is adjustably mounted on the rod 8 at a distance from the head 12 for moving the deflecting board back into the inoperative position. The rod 8 has a roller 15 at the outer end engaged by an eccentric or cam 16, the rod being pressed against the eccentric by springs 17. The eccentric is mounted on a shaft 18 journaled in the walls of a casing 19. A sector 20 is rotatively mounted on the upper portion of the shaft 18 and has a groove in its periphery for a cord or cable 21 extending to the outside of the casing to a point from which the conveyer is controlled.

The sector 20 has a pawl 22 pivoted at 23 and provided with a spring 24 which urges the pawl against the teeth of a ratchet wheel 25 attached to the upper side of the eccentric 16. A helical spring 26 presses the sector and the eccentric downward. The ends of this spring are attached to the sector and to the casing respectively, so that it operates also as a torsion spring, retrieving the sector after it has been pulled by the cord 21.

The ratchet wheel has the same number of pairs of teeth as the eccentric 16 has high points 27 and low points, so that with each pull on the cord the eccentric is displaced from a low to a high point or vice versa, the sector being so arranged that with each pull on the cord the pawl moves the ratchet wheel for an angle corresponding to the angular distance between two teeth i. e. 90°. The eccentric is prevented from sliding back by the arrangement of sliding teeth 28 at the lower side of the eccentric engaging corresponding teeth on a bottom bearing 29.

A door check or dash pot 30 is provided for the gate 1 in order to retard its return movement when the deflecting board 1 is moved back into its inoperative position. This is made in order to prevent a jamming of parts in the gate if the latter is closed too soon, before the parts have been fully removed and begin to move along the conveyer, the deflecting board no longer affecting their movement. For the same purpose the deflecting plate has a shorter leverage between the hinge and the heads of the rod than the gate, so that the deflecting board is operated more rapidly.

Any desired number of such distributing devices may be placed along the path of the conveyer. It is evident, of course, that electric motors or solenoids can be used for rotating the eccentrics.

It is understood that my distributing attachment for conveyers may be modified without departing from the spirit of the invention as set forth in the appended claims.

I claim as my invention:

1. A distributing device for a belt conveyer comprising a gate, means to hingedly support the gate at the side of the conveyer for rotation in the plane of the conveyer in an outward direction, a deflector board, means to hingedly support the board at the other side of the conveyer for rotation in the plane of the conveyer in an inward direction, means to open the gate and the board, the board in the opened position extending to the opposite edge of the conveyer, the gate and the board in the opened position forming a channel for diverting objects from the conveyer to its one side, means to close the board, and a yieldable means to close the gate independently of the board closing means.

2. A distributing device for a belt conveyer comprising a gate, means to hingedly support the gate at the side of the conveyer for rotation in the plane of the conveyer in an outward direction, a deflector board, means to hingedly support the board at the other side of the conveyer for rotation in the plane of the conveyer in an inward direction, an elongated member extending across the gate and the board, means on the member for engaging the gate and the board, means to move the member for opening the gate and the board, means to close the board by the member, and an independent means to close the gate at a slower rate than the closing of the board by the member.

3. A distributing device for a conveyer comprising a gate, means to hingedly support the gate at the side of the conveyer for rotation in the plane of the conveyer in an outward direction, a deflector board, means to hingedly support the board at the other side of the conveyer for rotation in the plane of the conveyer in an inward direction, an elongated member extending across the gate and the board, an enlarged portion on the end of the member for opening the gate, two enlarged portions on the rear portion of the member for opening and closing the board, means to move the member forward for opening the gate and the board, and means to move the member backward for closing the board, and a yieldable retrieving means for closing the gate, the retrieving means being adapted to close the gate at a slower speed than the movement of the member.

4. A distributing device for a conveyer comprising a gate, means to hingedly support the gate at the side of the conveyer for rotation in the plane of the conveyer in an outward direction, a deflector board, means to hingedly support the board at the other side of the conveyer for rotation in the plane of the conveyer in an inward direction, an elongated member extending across the gate and the board, means on the member for engaging the gate and the board, an eccentric rotatively supported at the side of the conveyer operatively connected to the member, means to rotate the eccentric, the eccentric being adapted in one position to open the gate and the board, and in the other position to close the board, and a yieldable means to close the gate.

5. A distributing device for a conveyer comprising a gate, means to hingedly support the gate at the side of the conveyer for rotation in the plane of the conveyer in an outward direction, a deflector board, means to hingedly support the board at the other side of the conveyer for rotation in the plane of the conveyer in an inward direction, an elongated member extending across the gate and the board, means on the member for engaging the gate and the board, an eccentric rotatively supported at the side of the conveyer operatively connected to the member, a ratchet mechanism connected with the eccentric, and an extension member adapted to operate the ratchet for turning the eccentric between its closing and opening positions.

6. A distributing device for a conveyer comprising a gate, means to hingedly support the gate at the side of the conveyer for rotation in the plane of the conveyer in an outward direction, a deflector board, means to hingedly support the board at the other side of the conveyer for rotation in the plane of the conveyer in an inward direction, an elongated member extending across the gate and the board, means on the member for engaging the gate and the board, an eccentric rotatively supported at the side of the conveyer operatively connected to the member, a ratchet mechanism connected with the eccentric, an extension member adapted to operate the ratchet for turning the eccentric between its closing and opening positions, and means to prevent the rotation of the eccentric in direction opposite to the operative movement of the extension member.

ANATOL PERESLEGIN.